United States Patent [19]
Jasuja et al.

[11] Patent Number: 5,987,580
[45] Date of Patent: Nov. 16, 1999

[54] SERIALLY REUSABLE EXECUTION MEMORY

[75] Inventors: Amit Jasuja, Belmont; Mark Ramacher, San Mateo; Kannan Muthukkaruppan, Foster City, all of Calif.

[73] Assignee: Oracle Corporation, Redwood Shores, Calif.

[21] Appl. No.: 08/835,160

[22] Filed: Apr. 4, 1997

[51] Int. Cl.⁶ .................................................. G06F 12/00
[52] U.S. Cl. ............................................ 711/170; 707/206
[58] Field of Search .................................. 711/173, 170, 711/171, 172, 100; 707/206; 710/56

[56] References Cited

U.S. PATENT DOCUMENTS

| | | | |
|---|---|---|---|
| 5,561,785 | 10/1996 | Blandy et al. | 707/206 |
| 5,561,786 | 10/1996 | Morse | 707/205 |
| 5,577,246 | 11/1996 | Priddy et al. | 711/173 |
| 5,623,654 | 4/1997 | Peterman | 707/206 |
| 5,835,914 | 11/1998 | Brim | 707/206 |

OTHER PUBLICATIONS

Microsoft Press Computer Dictionary, Second Edition, p. 105, 1994.

Druker, D., "RDBMS Feature Comparison" [Online] news://comp.databases, Jun. 15, 1993.

Vanderheide, H., "Database Feature Comparison" [Online] news://comp.databases.oracle, May 5, 1996.

Leebert, "New Win/NT RDBMS comparison matrix" [Online] news://comp.client–server, Feb. 5, 1996.

Gabriel, R. "Persistence in a Programming Environment" Dr. Dobb's Journal (Dec. 1992):46.

Peterson, S. "A Memory Allocation Compaction System" Dr. Dobb's Journal (Apr. 1989):50.

Applegate, A. "Rethinking Memory Management" Dr. Dobb's Journal (Jun. 1994):52.

Moeser, R. "A Memory Controller" Dr. Dobb's Journal (May 1990):58.

*Primary Examiner*—Eddie P. Chan
*Assistant Examiner*—Yamir Encarnación
*Attorney, Agent, or Firm*—McDermott, Will & Emery

[57] ABSTRACT

Execution memory for use in processing a program unit for a database is allocated by inspecting an execution memory area pool for a previously allocated execution memory area. If a previously allocated execution memory area is found, then the previously allocated execution memory area is established as the execution memory area for executing the program unit. On the other hand, if a previously allocated execution memory area is not found, then a new execution memory area is allocated and configured for executing the program unit.

21 Claims, 4 Drawing Sheets

FIG. 4 ns and
more particularly to managing memory for executing database program units.

BACKGROUND OF THE INVENTION

Relational databases store information in tables. A user retrieves information from the tables by entering input that is converted to queries by a database application. The database application submits the queries to a database server. In response to a query, the database server accesses the table specified in the query to determine which information within the tables satisfies the queries. The information that satisfies the queries is then retrieved by the database server and transmitted to the data application, and ultimately to the user.

For any given database server, the queries must conform to the rules of a particular query language. Most query languages provide users a variety of ways to specify information to be retrieved. For example, in the Structured Query Language (SQL), the query:

SELECT * FROM t1 requests the retrieval of the information contained in all rows of table "t1." Since a query directs a database server to perform a series of actions, a query is an example of a database "program unit."

When a database server executes the query, the database server must first allocate and configure execution memory for a "work area" used to store state and context information during the execution of the query. The structure of the work area is specific to a small set of similar queries. Various approaches have been developed for setting up the work area for a query.

In particular, a work area is configured by allocating a plurality of separately sized memory chunks. The number of memory chunks and size of each memory chunk are dependent on specific aspects of a query such as the number and nature of input variables and output variables for the query. The memory within each memory chunk is initialized to zero, and as another part of the configuration process, an array of pointers to these memory chunks is allocated and initialized. Allocating and configuring memory for the work area are both non-trivial, expensive operations.

According to a "per-use" approach, a specific memory area is dynamically allocated and configured as a work area for the user requesting the query for each execution of the query. When the execution of the query has completed, that memory is deallocated. If the user later submits another query, then another work area has to be dynamically allocated and configured before executing the query and deallocated afterwards. In other words, the cycle of allocating, configuring, and deallocating a work area is substantially repeated for each query. In particular, the process of configuring the work area is especially expensive, and it is desirable to avoid this expense.

The cost of the per-use allocation method may be illustrated with respect to a mail database system at a large company site. Typically, these mail database systems have a very large number of users, but each user only performs a small set of queries (i.e., fetch the new mail). If a mail database system has 10,000 users and each user fetches new mail twice a day, then the mail database system would have to allocate and configure 20,000 work areas throughout the day.

According to another approach, a work area is allocated and configured for a user in response to the first query the user submits. Instead of deallocating the work area when execution of the query completes, the database server maintains the work area for the continued use by that same user until the user logs out. In a subsequent query by the user during the same log in session, the previously allocated and configured work area for that session is reused for executing the query. This "per-session" approach saves the time it takes to allocate and configure the work area for a subsequent query by a user during the session.

In the example of the mail database system, if the 10,000 users log in at the beginning of the day and log out at the end of the day, and fetch their new mail twice, then the second query for each user would save the work area allocation and configuration costs. In this case, 10,000 work areas would be allocated and configured, half the number of the per-use approach. Accordingly, the per-session allocation approach works best when the number of separate, logged-in users is low. However, the per-session approach does not perform well when the number of users is large because maintaining an allocated and configured work area for each user may consume an unacceptably high amount of system resources for long periods. In this example, the mail database system would have to maintain 10,000 concurrent work areas in system memory by the end of the day.

A PL/SQL package is another example of a database program unit that is written in a high-level language and is called to direct a database server to perform a series of actions. When a package is called, the database system instantiates a package frame to maintain variables for the package. Like work areas for queries, the structure of a package frame is specific to a small set of similar packages and package frame instantiation has considerable allocation and configuration costs. For example, a package frame for a PL/SQL package contains an allocated and initialized dependency vector pointing to other PL/SQL packages that are needed to process this PL/SQL package. Furthermore, the memory requirements for global variables of a PL/SQL must be calculated, and the required memory must be allocated and initialized to zero. Accordingly, the configuration costs of instantiating a package frame are considerable.

Normally, the global variables instantiated in a PL/SQL package have values that persist as long as the user calling the package is logged in. In other words, such global variables have a session lifetime. Accordingly, PL/SQL package frames are instantiated on a per-session basis. Many packages, however, do not need to take advantage of the session lifetime feature for global variables. Nevertheless, these packages are conventionally instantiated according to a per-session approach with the same drawbacks as the per-session approach for allocating and configuring work areas for queries: system memory is excessively depleted.

Therefore, there is a need for a method of managing execution memory for database program units that neither incurs the expensive allocation and configuration costs of a per-use allocation scheme nor excessively depletes system memory in a per-session allocation scheme.

SUMMARY OF THE INVENTION

In accordance with one aspect of the invention, a method for allocating an execution memory area to execute a program unit in a database system comprises the step of inspecting an execution memory area pool to find a previously allocated execution area that is currently unused but available for use to users of the database system. If a previously allocated execution memory area is found, then it is established as the execution memory area to execute the program unit. On the other hand, if no previously allocated execution memory area is found, then a new execution memory area is allocated, configured, and established as the execution memory area to execute the program unit. After the query is processed using the execution memory area, the execution memory area is added to the execution area pool.

In accordance with another aspect of the invention, a method for allocating an execution memory area to execute a program unit comprises the step of allocating as an execution memory area for a first program unit from a first user an execution memory space that was previously used to execute a second program unit from a second user. The execution memory space has not been deallocated since being used to execute the second program unit from the second user. The execution memory area allocated in this manner is used to execute the first program unit.

Still other objects and advantages of the present invention will become readily apparent from the following detailed description, simply by way of illustration of the best mode contemplated of carrying out the invention. As will be realized, the invention is capable of other and different embodiments, and its several details are capable of modifications in various obvious respects, all without departing from the invention. Accordingly, the drawing and description are to be regarded as illustrative in nature, and not as restrictive.

BRIEF DESCRIPTION OF THE DRAWINGS

The present invention is illustrated by way of example, and not by way of limitation, in the figures of the accompanying drawings and in which like reference numerals refer to similar elements and in which.

DESCRIPTION OF THE PREFERRED EMBODIMENT

A method for allocating and configuring execution memory to execute a program unit is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

HARDWARE OVERVIEW

Figure 1:
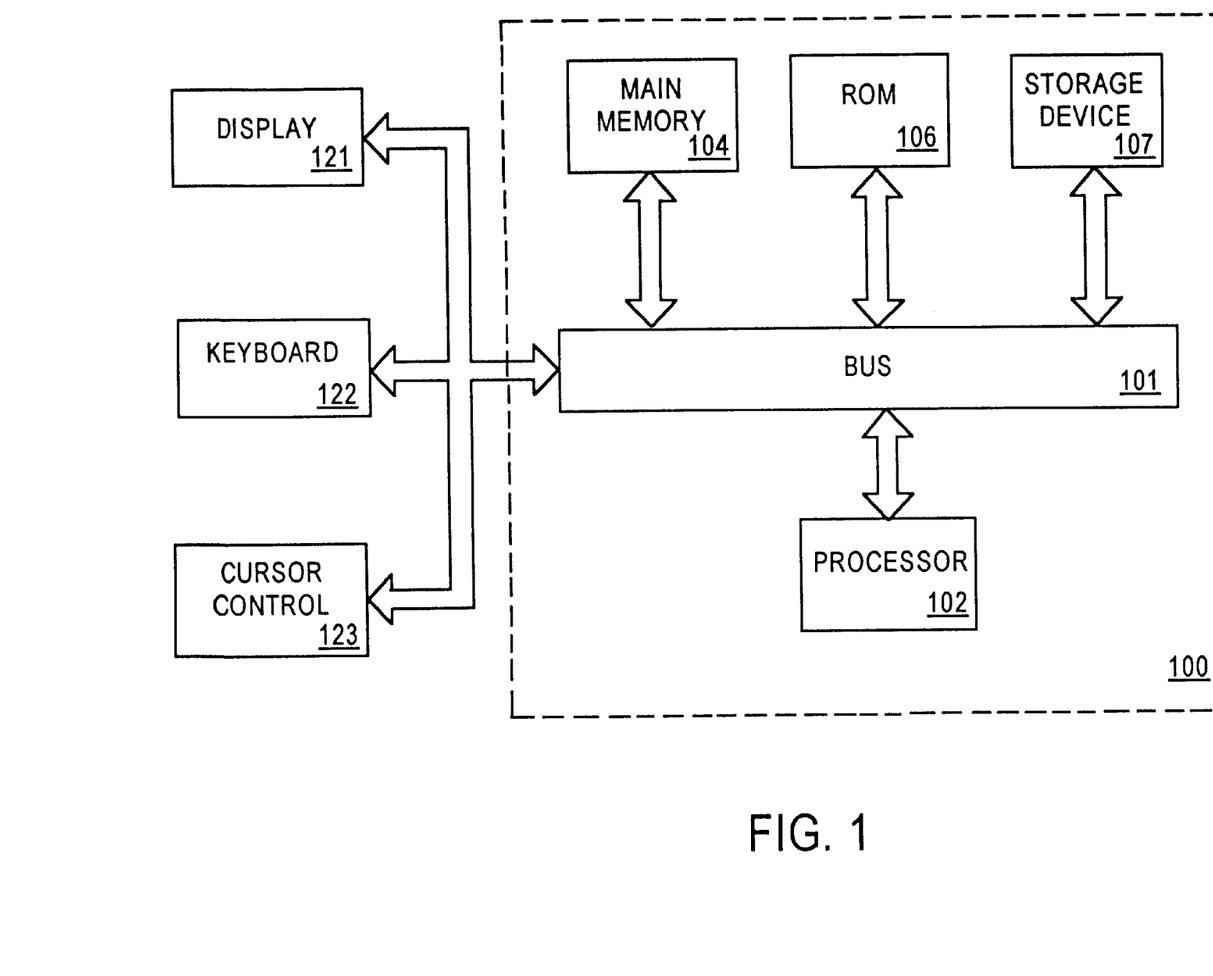
FIG. 1 is a block diagram of a system, which may be programmed to implement the present invention.

Referring to FIG. 1, it is a block diagram of a computer system 100 upon which an embodiment of the present invention can be implemented. Computer system 100 includes a bus 101 or other communication mechanism for communicating information, and a processor 102 coupled with bus 101 for processing information. Computer system 100 further comprises a random access memory (RAM) or other dynamic storage device 104 (referred to as main memory), coupled to bus 101 for storing information and instructions to be executed by processor 102. Main memory 104 also may be used for storing temporary variables or other intermediate information during execution of instructions by processor 102.

An operating system executed by processor 102 for a multi-process, multi-user computer system designates portions of main memory 104 as private or shared. Private memory is that memory which may only be used by a single user process and the operating system. Shared memory, on the other hand, may be accessed by a plurality of user processes, owned by a plurality of users. Session memory is a form of shared memory, which is shared among those processes spawned in a single login session by a user, but not between processes belonging to other users.

Computer system 100 also comprises a read only memory (ROM) and/or other static storage device 106 coupled to bus 101 for storing static information and instructions for processor 102. Data storage device 107 is coupled to bus 101 for storing information and instructions.

A data storage device 107 such as a magnetic disk or optical disk and its corresponding disk drive can be coupled to computer system 100. Computer system 100 can also be coupled via bus 101 to a display device 121, such as a cathode ray tube (CRT), for displaying information to a computer user. Computer system 100 further includes a keyboard 122 and a cursor control 123, such as a mouse.

The present invention is related to the use of computer system 100 to allocate an execution memory area in executing a program unit. According to one embodiment, allocating an execution memory area to execute a program unit is performed by computer system 100 in response to processor 102 executing sequences of instructions contained in memory 104. Such instructions may be read into memory 104 from another computer-readable medium, such as data storage device 107. Execution of the sequences of instructions contained in memory 104 causes processor 102 to perform the process steps that will be described hereafter. In alternative embodiments, hard-wired circuitry may be used in place of or in combination with software instructions to implement the present invention. Thus, the present invention is not limited to any specific combination of hardware circuitry and software.

MAINTAINING A POOL OF WORK AREAS

According to one embodiment of the invention, work areas for processing queries are allocated out of a work area pool, which is implemented as a linked list of work areas. Each node of the linked list contains a pointer to a work area and a pointer to the next node in the linked list, to encapsulate the implementation of the work area pool. The database server maintains two linked lists of work areas, an in-use list and a free list. The in-use list is a list of work areas that are currently being used during the execution of a query. The free list is a list of work areas that are available for use.

Figure 2:
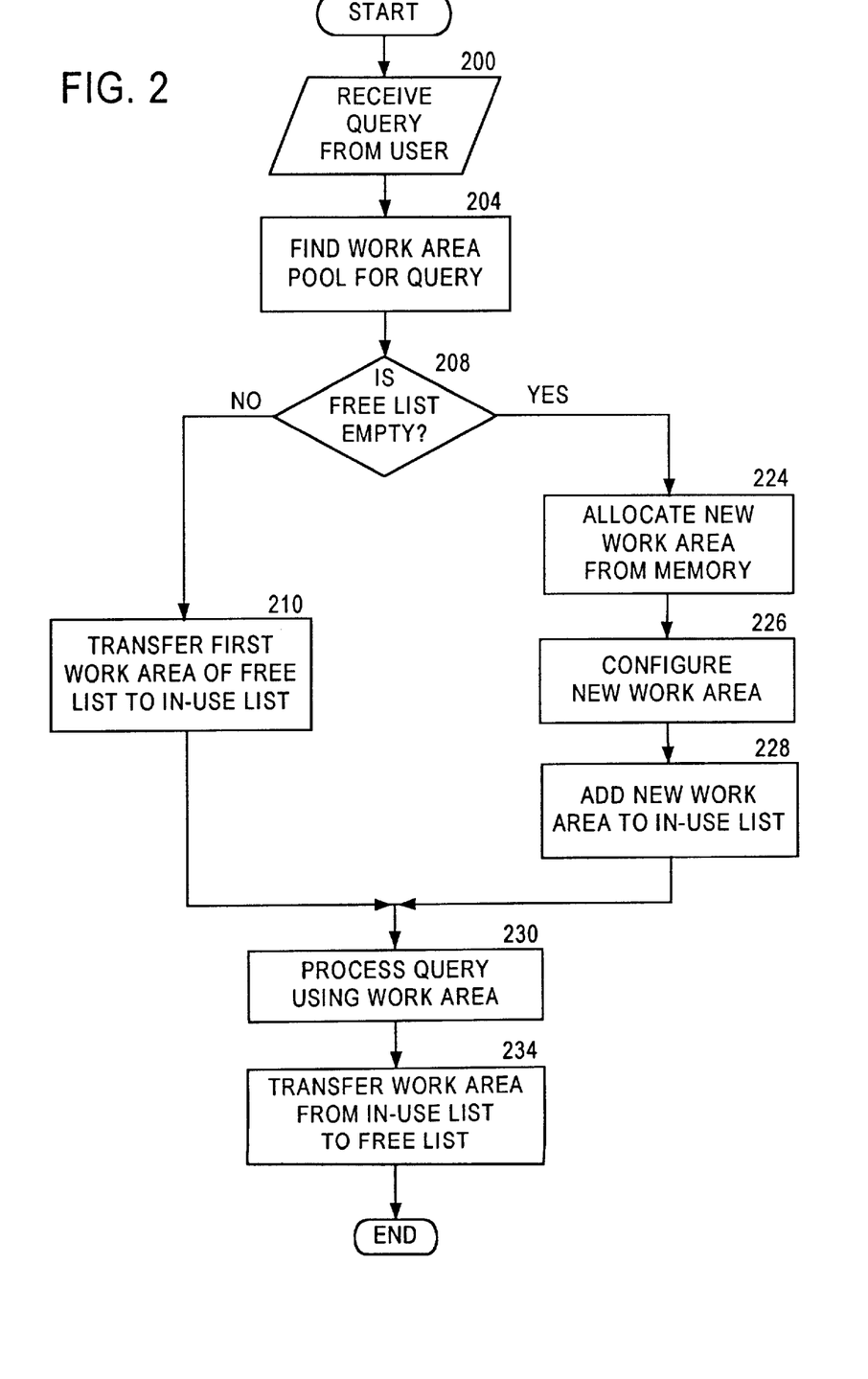
FIG. 2 is a flowchart illustrating steps for serially reusing a work area according to an embodiment of the invention.

With reference to the flowchart of FIG. 2, after the database server receives a query from the user (step 200), the server finds a work area pool appropriate to that query (step 202). A preferred embodiment of the invention maintains a plurality of work area pools each associated with a particular query. In this embodiment, the string describing a query is hashed to produce a hash key. The hash key is used to find in a hash table a pointer to a data structure that contains a work area pool for that query. Since each work area pool is associated with similar queries as determined by the query string, work areas in the work area are already configured for that type of query. Accordingly, the expense of reconfiguring a work area is saved.

After the work area pool is located, the free list of the work area pool is inspected for an available work area (step 208). If the free list is not empty, the database server transfers the first work area of the free list from the free list to the in-use list (step 210).

On the other hand, if the free list is empty, the database server allocates a new work area from shared memory (step 224) and configures the work area (step 226). After the work area is allocated and configured, the database server adds the work area to the in-use list (step 228).

Once the work area is obtained, either from the free-list or by allocating and configuring a new work area, and placed on the in-use list the database server executes the query using the work area (step 230). After the query is executed, the database server transfers the work area from the in-use list to the free list (step 234).

In this manner, after a user executes a query, the previously allocated and configured work area now on the free list is available for the next similar query by the same user or by another user to be executed. If, however, another user makes a similar query at the same time ("concurrently") as another user, the previously allocated and configured work area is not on the free list but on the in-use list. Consequently, a concurrent query requires a new allocation and configuration of a work area. Therefore, the number of allocated work areas grows to reach the maximum number of concurrently executing queries.

Compared to the per-use allocation method, the number of concurrently executing queries is much smaller than the total number of queries, meaning that most queries will be able to reuse a work area. Therefore, most of the allocation and configuration costs of the per-use approach are avoided.

Contrary to the per-session allocation method in which a work area is maintained for each logged-in user, a work area is maintained for each user who is concurrently executing a query. In the example of a mail database system with 10,000 users making two queries a day, the mail database system processes an average of 2500 queries an hour. If each query takes about a minute to execute, then about 42 queries can be expected to be executing concurrently, assuming a uniform distribution of queries. Therefore, only 42 work areas would need to be allocated and maintained throughout the day, a substantial reduction compared to the 10,000 work areas of the per-session allocation approach.

AGING OUT A POOLED WORK AREA

In the previous example of the mail database system, only 42 work areas need be allocated and maintained throughout the day, if there is a uniform distribution of mail queries. For a mail database system, however, such an assumption is not realistic because most users prefer to log in and check their mail at the beginning of the day. Thus, it is likely that at certain times of the day much more than 42 queries would be executing concurrently. Assuming for sake of illustration, the number of concurrent queries jumps to 100. Therefore, 100 allocated work areas would be maintained throughout the day.

According to an embodiment of the invention, if the least recently used work area in the free list has not been used in a certain amount of time, that work area is "aged out" and deallocated. Aging out the least recently used work area allows the number of work areas to be reduced as the database system load decreases during the day. Thus, the number of maintained work areas in the free list approximates the average number, not the maximum number, of concurrent queries for a database system. Although there is an expense of performing a few more allocations and configurations of work areas as the database system load increases at some times of the day, fewer allocated work area are maintained when the database system load decreases at other times of the day.

CONCURRENCY CONTROL

As described, many users of the database system may execute their queries nearly simultaneously, necessitating the concurrent usage of a shared resource, the work area pool. As the number of active users increases, the opportunities for incompatible modifications to the shared work area pool likewise increases. For example, referring to FIG. 2, consider a free list with one work area pooled in it and two processes: process A, handling a query for one user, at step 208 and process B, handling a similar query for another user, at step 210. Process B has already checked the free list (step 208) and found that there is an entry in it. If process A checks the free list (step 208) before process B transfers the work area on the free list to the in-use list (step 210), then process A will proceed to step 210. In this situation, process A will corrupt the work area being used by process B.

Figure 3:
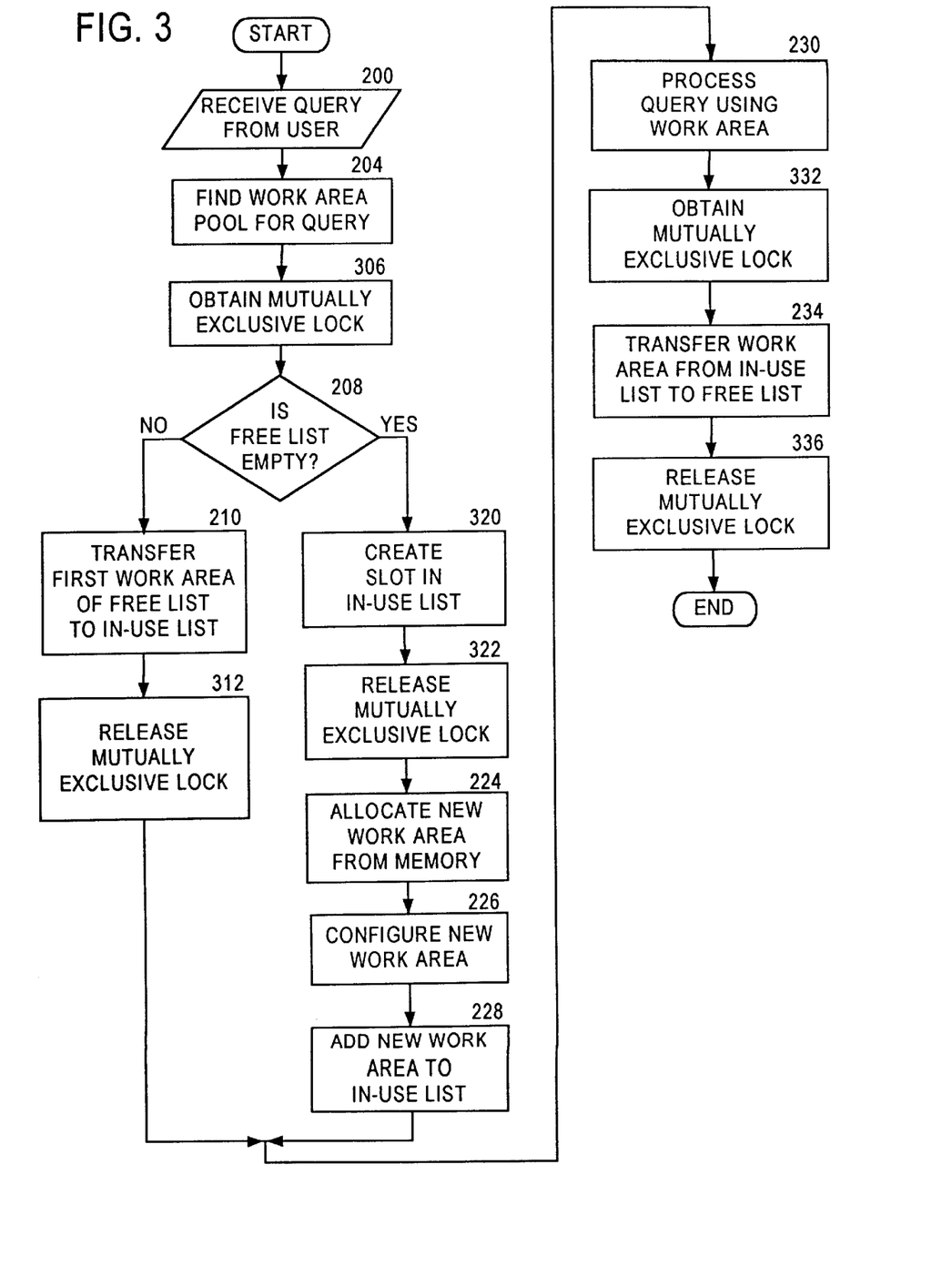
FIG. 3 is a flowchart illustrating steps for serially reusing a work area with concurrency control according to another embodiment of the invention.

Accordingly, one embodiment of the invention uses a mutually exclusive lock, such as a semaphore or a concurrency latch, to protect modifications to the free list and the in-use list. With reference to FIG. 3, a process, after receiving a query from a user (step 200) and finding a work area pool for the query (step 202), must obtain a mutually exclusive lock (step 306) before inspecting the free list for an available work area (step 208). If the mutually exclusive lock is already being held, then the process will block until it can obtain the lock. After obtaining the lock, the process is allowed to inspect the free list (step 208). If the free list is not empty, then the process transfers the first work area of the free list to the in-use list (step 210) and releases the lock (step 312).

On the other hand, if the free list is empty, then the process creates an empty slot in the in-use list (step 320) and releases the lock (step 322). After releasing the lock, the process performs the relatively slow steps of allocating a new work area (step 224) and configuring the new work area (step 226). Once the new work area is ready, the process adds the new work area into the empty slot of the in-use list (step 228). The purpose for creating the empty slot in step 320 is to reduce the amount of time a process holds on to a lock. Creating the empty slot allows the lock to be released before the relatively slower steps 226 and 228 are performed.

After processing a query with a work area (step 230), the process obtains the mutually exclusive lock (step 332), transfers the work area from the in-use list to the free list (step 234), and releases the lock (step 336).

In this manner, the lock forces a process to wait until another process is finished with modifying the free list or the in-use list. Back to that example, if process B is already at step 210, then process B holds the mutually exclusive lock. Thus, process A at step 12 is blocked until process B releases the lock at step 312 after the transfer is complete. When process A finally obtains the lock, the work area that process B was transferring is no longer a member of the free list but a member of the in-use list. Therefore, process A will not corrupt the work area process B is using.

SERIAL REUSE OF PACKAGE FRAMES

According to another embodiment of the invention, execution memory for PL/SQL packages that do not require package variables to have a session lifetime is serially reused. However, since serial reuse is incompatible with the session lifetime feature of global variables, the database system must be able to distinguish which packages do not need this feature and thus may benefit from serial use of package frames. In a preferred embodiment, a user must explicitly mark a package with a pragma to allow the package frame for that package to be reused.

Serial reuse of package frames is implemented in a manner analogous to the serial reuse of query work areas. Package frames are allocated out of a pool of previously configured package frames, implemented as a linked list of package frames. The database server maintains two linked lists of package frames, an in-use list and a free list. The in-use-list is a list of package frames that are currently being used during the call of a package, and the free list is a list of package frames that are available for use.

Figure 4:
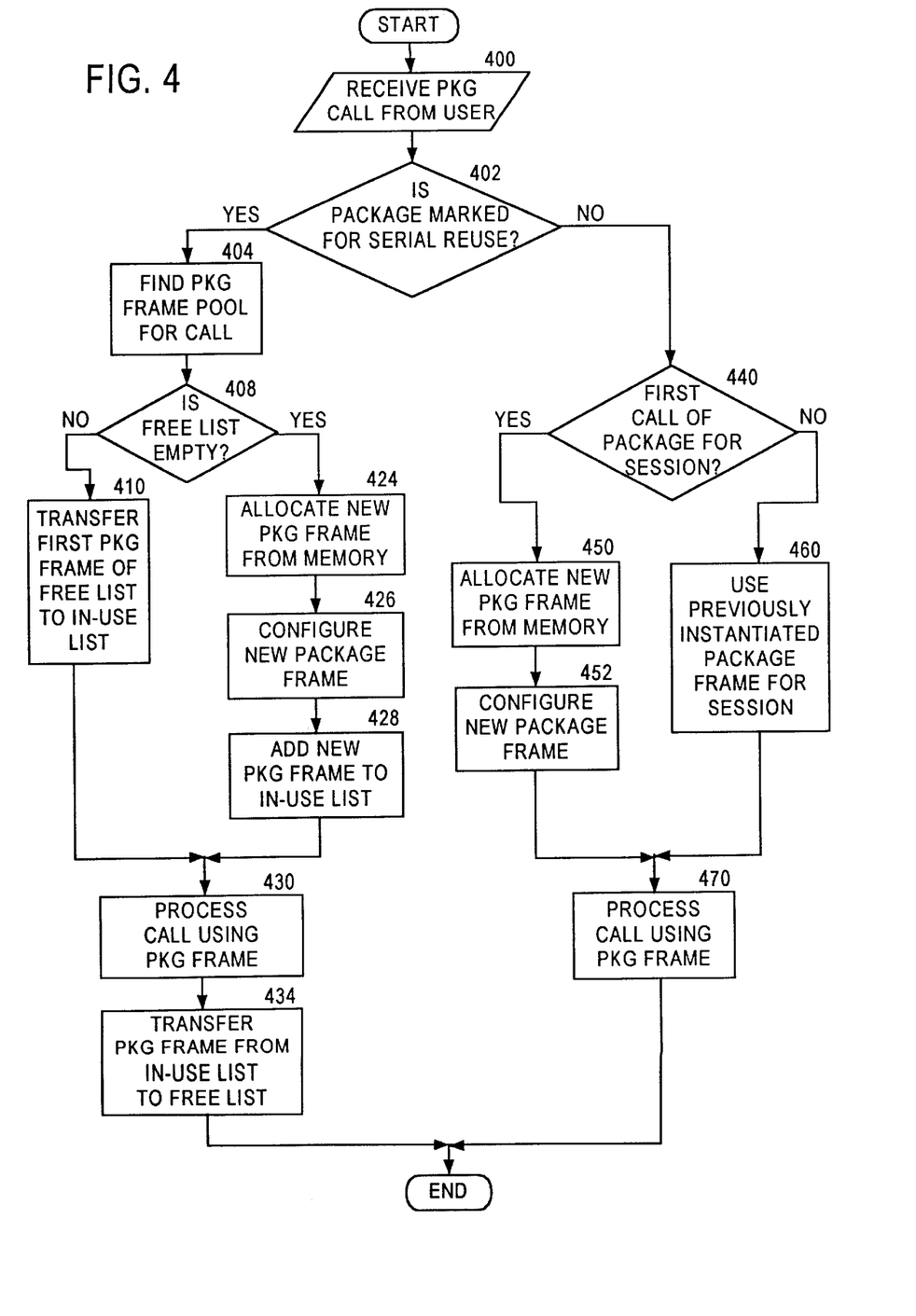
FIG. 4 is a flowchart illustrating steps for serially reusing a package frame according to another embodiment of the invention.

With reference to the flowchart of FIG. 4, the database server receives a call of a package from a user (step 400) and checks whether the package has been marked for serial reuse (step 402). If the package has indeed been marked for serial reuse, then execution proceeds to step 404, where the proper package frame pool is found for the package by using a unique specification for the package. Various means for uniquely specifying a package are known and may be used. According to one embodiment, the fully qualified string name of the package is used, preferably in conjunction with a hash table. A fully qualified string name of a package is the concatenation of the string name of the package and the schema name of the owner of the package. For example, "scott.foo" is the fully qualified string name of package "foo" owned by "scott".

After the package frame pool is located, the free list of the package frame pool is inspected for an available package frame (step 408). If the free list is not empty, the computer system transfers the first package frame of the free list from the free list to the in-use list (step 410).

On the other hand, if the free list is empty, the computer system allocates a new package frame from shared memory (step 424) and configures the package frame (step 426). After the package frame is allocated and configured, the package frame is added to the in-use list (step 428).

Once the package frame is obtained, either from the free-list or by allocating and configuring a new package frame, and placed on the in-use list, the package is executed using the obtained package frame (step 430). After the package is executed, the package frame is transferred from the in-use list to the free list (step 434).

If the package is not marked for serial reuse (step 402), then the normal per-session allocation is used. The computer system first checks whether the package call is the first call for the package during the login session (step 440). If the package call is the first such call, then a new package frame is allocated out of session memory (step 450) and configured (step 452). On the other hand, if the package call is not the first such call, then the previously instantiated package frame is established at the package frame to be used (step 460). Finally, the computer system executes the package call using the package frame (step 470).

According to one embodiment of the invention, least recently used package frames are aged out and deallocated in manner analogously described above for work areas. Consequently, the number of package frames approximates the average number, not the maximum number, of concurrent users. In addition, one embodiment of the invention implements concurrency control for allocating package frames in a manner analogous to the concurrency control described above for work areas. Specifically, a mutually exclusive lock is obtained before modifying either the free list or in-use list and released after modifying either the free list or in-use list.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for allocating an execution memory area to execute a program unit, comprising the computer-implemented steps of:

in response to receiving a command to execute said program unit, inspecting an execution memory area pool to find a previously allocated and configured execution memory area that is currently unused, wherein said previously allocated and configured execution memory area includes a plurality of memory chunks and pointers initialized to the memory chunks;

wherein said execution memory area pool contains execution memory areas that are available to a plurality of users;

if a previously allocated and configured execution memory area is found in said execution memory area pool, then establishing said previously allocated and configured execution memory area as said execution memory area to execute said program unit;

if a previously allocated and configured execution memory area is not found in said execution memory area pool, then performing the steps of:
 allocating a new execution memory area by allocating a plurality of new memory chunks,
 configuring said new execution memory area by initializing pointers to the new memory chunks, and
 establishing said new execution memory area as said execution memory area to execute said program unit;

executing said program unit using said execution memory area as configured; and if said execution memory area is not already in said execution memory pool, then adding said execution memory area to said execution memory area pool.

2. The method of claim 1, further comprising the step of finding an execution memory area pool associated with said program unit from a plurality of execution memory area pools;

wherein said execution memory pool contains said previously allocated and configured execution memory area.

3. The method of claim 2, wherein the step of finding an execution memory area pool associated with said program unit from a plurality of execution memory area pools includes the steps of:

storing a reference to said execution memory area pool associated with said program unit in a hash table;

hashing a string describing said program unit into a hash key; and looking up said reference in said hash table with said hash table key.

4. The method of claim 1, further comprising the step of deallocating an old execution memory area in said execution memory area pool, wherein said old execution memory area is a least recently used, within a prescribed amount of time, execution memory area of all execution memory areas within said execution memory area pool.

5. The method of claim 1, wherein:

said execution memory area pool is a free list of previously allocated and configured execution memory areas;

the step of inspecting an execution memory area pool to find a previously allocated and configured execution memory area includes the step of checking for a first previously allocated and configured execution memory area of said free list;

the step of establishing said previously allocated and configured execution memory area as said execution memory area to execute said program unit includes the step of moving said first pooled execution memory area from said free list to an in-use list of execution memory areas;

the step of establishing said new execution memory area as said execution memory area to execute said program unit includes the step of adding said new execution memory area to said in-use list; and the step of adding said work area to said execution memory area pool includes the step of moving said execution memory area from said in-use list to said free list.

6. The method of claim 5, further comprising the steps of:

obtaining a mutually exclusive lock before inspecting the execution memory area pool;

releasing the mutually exclusive lock after establishing said previously allocated and configured execution memory area as said execution memory area to execute said program unit;

before allocating the new execution memory area, performing the steps of: creating an empty slot in said in-use list and releasing the mutually exclusive lock after creating the empty slot;

obtaining the mutually exclusive lock before adding said execution memory area to said execution memory area pool;

releasing the mutually exclusive lock after adding said execution memory area to said execution memory area pool; and wherein the step of adding said new execution memory area to said in-use list includes the step of adding said new execution memory area to the empty slot of said in-use list.

7. The method of claim 1, wherein the step of allocating a new execution memory area includes the step of allocating a new execution memory area from a shared memory.

8. The method of claim 1, wherein
the step of executing said program unit using said execution memory area includes the step of executing a query using a work area.

9. The method of claim 1, wherein
the step of executing said program unit using said execution memory area includes the step of executing a package using a package frame.

10. A computer readable medium having stored thereon sequences of instructions for allocating an execution memory area to execute a program unit, said sequences of instructions including instructions for performing the steps of:

in response to receiving a command to execute said program unit, inspecting an execution memory area pool to find a previously allocated and configured execution memory area that is currently unused, wherein said previously allocated and configured execution memory area includes a plurality of memory chunks and pointers initialized to the memory chunks;

wherein said execution memory area pool contains execution memory areas that are available to a plurality of users in a database system;

if a previously allocated and configured execution memory area is found in said execution memory area pool, then establishing said previously allocated and configured execution memory area as said execution memory area to execute said program unit;

if a previously allocated and configured execution memory area is not found in said execution memory area pool, then performing the steps of:

allocating a new execution memory area by allocating a plurality of new memory chunks, configuring said new execution memory area by initializing pointers to the memory chunks, and establishing said new execution memory area as said execution memory area to execute said program unit;

executing said program unit using said execution memory area as configured; and if said execution memory area is not already in said execution memory area pool then adding said execution memory area to said execution memory area pool.

11. The computer readable medium of claim 10, wherein said sequence of instructions further includes instructions for performing the step of finding an execution memory area pool associated with said program unit from a plurality of execution memory area pools;

wherein said execution memory pool contains said previously allocated and configured execution memory area.

12. The computer readable medium of claim 11, wherein the step of finding an execution memory area pool associated with said program unit from a plurality of execution memory area pools includes the steps of:

storing a reference to said execution memory area pool associated with said program unit in a hash table;

hashing a string describing said program unit into a hash key; and looking up said reference in said hash table with said hash key.

13. The computer readable medium of claim 10, further comprising instructions for performing the step of deallocating an old execution memory area in said execution memory area pool, wherein said old execution memory area is a least recently used, within a prescribed amount of time, execution memory area of all execution memory areas within said execution memory area pool.

14. The computer readable medium of claim 10, wherein:

said execution memory area pool is a free list of previously allocated and configured execution memory areas;

the step of inspecting an execution memory area pool to find a previously allocated and configured execution memory area includes the step of checking for a first previously allocated and configured execution memory area of said free list;

the step of establishing said previously allocated and configured execution memory area as said execution memory area to execute said program unit includes the step of moving said first pooled execution memory area from said free list to an in-use list of execution memory areas;

the step of establishing said new execution memory area as said execution memory area to execute said program unit includes the step of adding said new execution memory area to said in-use list; and the step of adding said execution memory area to said execution memory area pool includes the step of moving said execution memory area from said in-use list to said free list.

15. The computer readable medium of claim 14, further comprising instructions for performing the steps of:

obtaining a mutually exclusive lock before inspecting the execution memory area pool;

releasing the mutually exclusive lock after establishing said previously allocated and configured execution memory area as said execution memory area to execute said program unit;

before allocating the new execution memory area, performing the steps of:

creating an empty slot in said in-use list and releasing the mutually exclusive lock after creating the empty slot; obtaining the mutually exclusive lock before adding said execution memory area to said execution memory area pool; releasing the mutually exclusive lock after adding said execution memory area to said execution memory area pool; and wherein the step of adding said new execution memory area to said in-use list includes the step of adding said new execution memory area to the empty slot of said in-use list.

16. The computer readable medium of claim 10, wherein the step of allocating a new execution memory area includes the step of allocating a new execution memory area from a shared memory.

17. The computer readable medium of claim 10, wherein the step of executing said program unit using said execution memory area includes the step of executing a query using a work area.

18. The computer readable medium of claim 10, wherein the step of executing said program unit using said execution memory area includes the step of executing a package using a package frame.

19. A method for executing a database program unit, comprising the computer-implemented steps of:

establishing, as an execution memory area for a first database program unit from a first user, a previously allocated and configured execution memory area that was previously used to execute a second database program unit from a second user other than the first user, wherein said previously allocated and configured execution memory area has not been deallocated since being used to execute said second database program unit from said second user; and executing said first database program unit using said execution memory area;

wherein said previously allocated and configured execution memory area includes a plurality of memory chunks and pointers initialized to the memory chunks.

20. The method of claim 19 further comprising the step of inspecting an execution memory area pool to find said execution memory area, wherein said execution memory area pool contains execution memory areas that are available to a plurality of users of said database system.

21. The method of claim 20 further comprising the step of adding said execution memory area to said execution memory area pool.

* * * * *